March 17, 1953  J. E. ROBINSON  2,632,148
SYSTEM FOR THE TRANSMISSION OF INTELLIGENCE BY RADIO
Original Filed Jan. 3, 1948  8 Sheets-Sheet 1
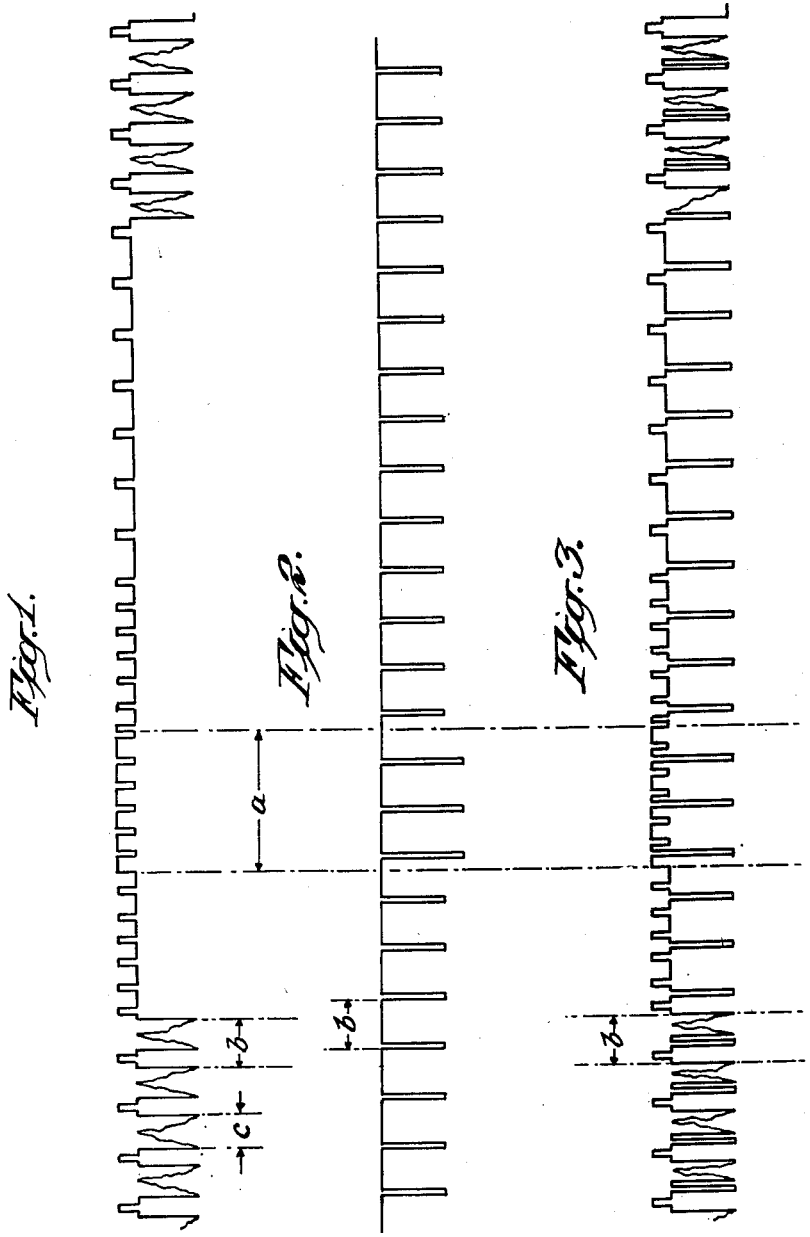
INVENTOR.
James E. Robinson
BY Darby & Darby
ATTORNEYS

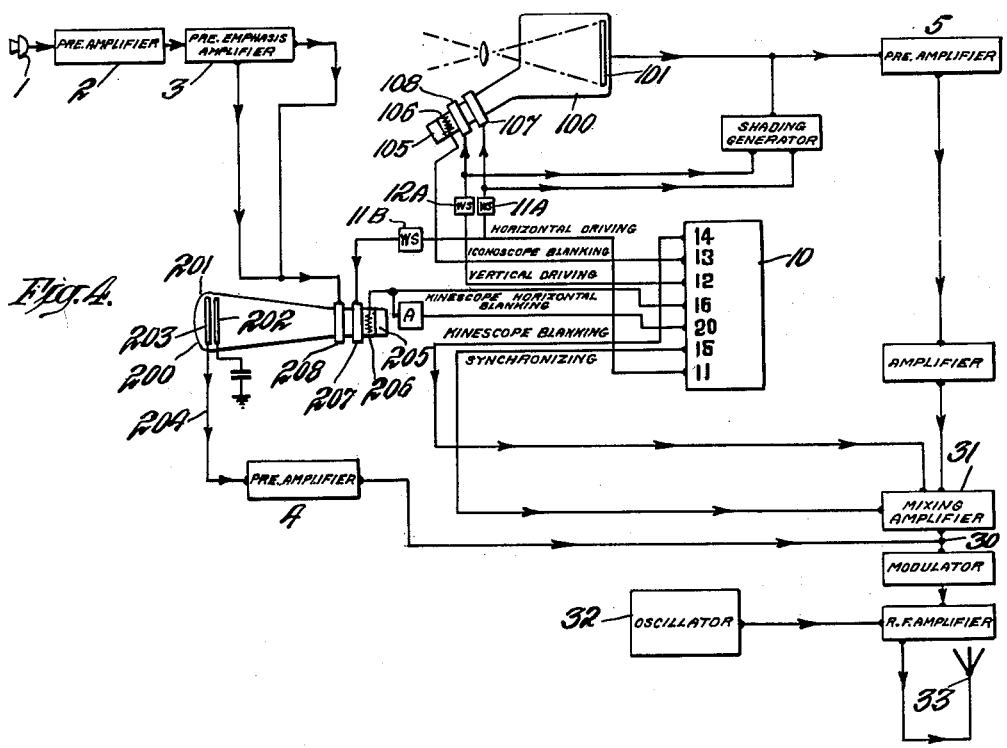
Fig. 4.
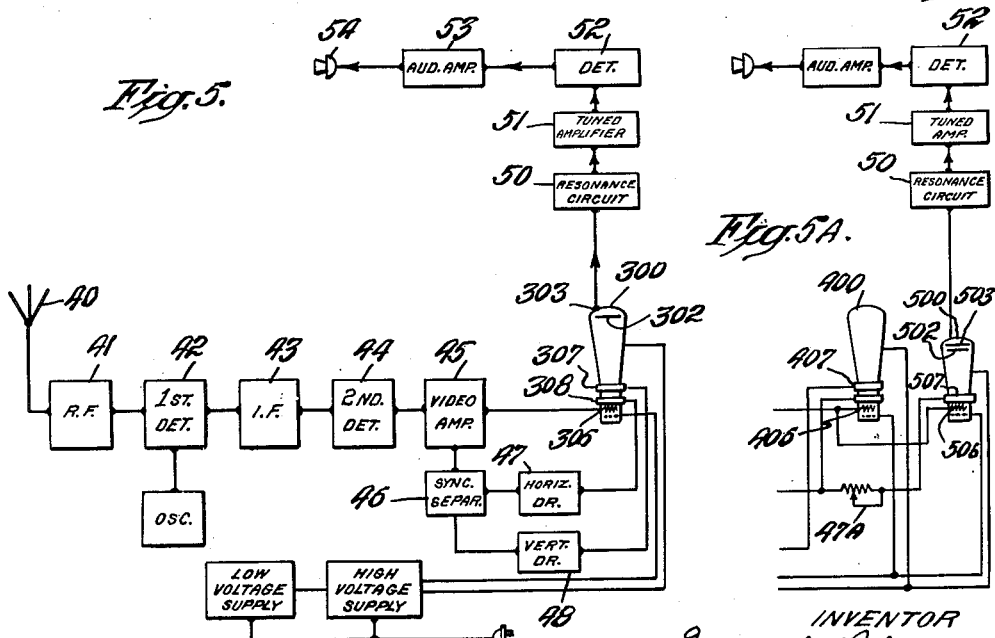
Fig. 5.
Fig. 5A.
INVENTOR
James E. Robinson
BY Darby & Darby
ATTORNEYS March 17, 1953     J. E. ROBINSON     2,632,148
SYSTEM FOR THE TRANSMISSION OF INTELLIGENCE BY RADIO
Original Filed Jan. 3, 1948     8 Sheets-Sheet 3
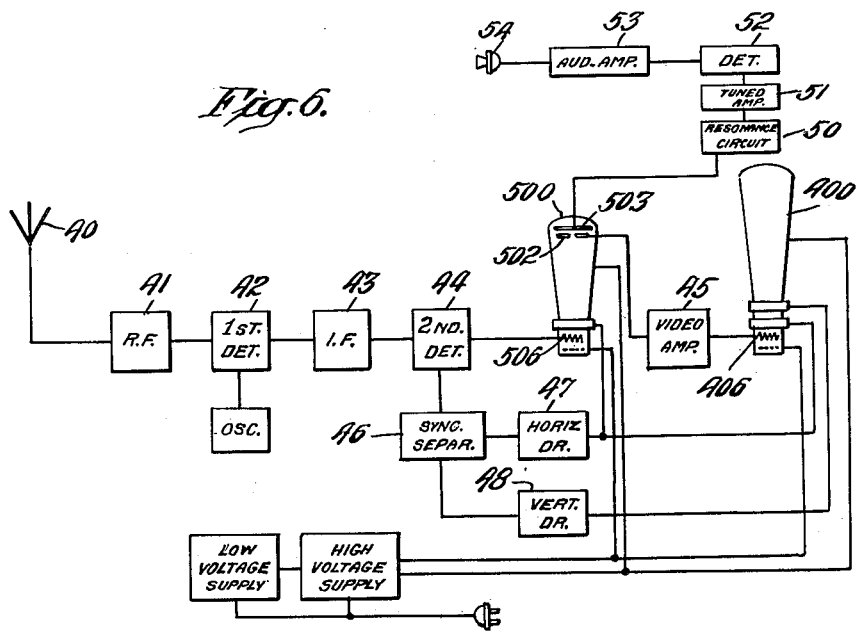
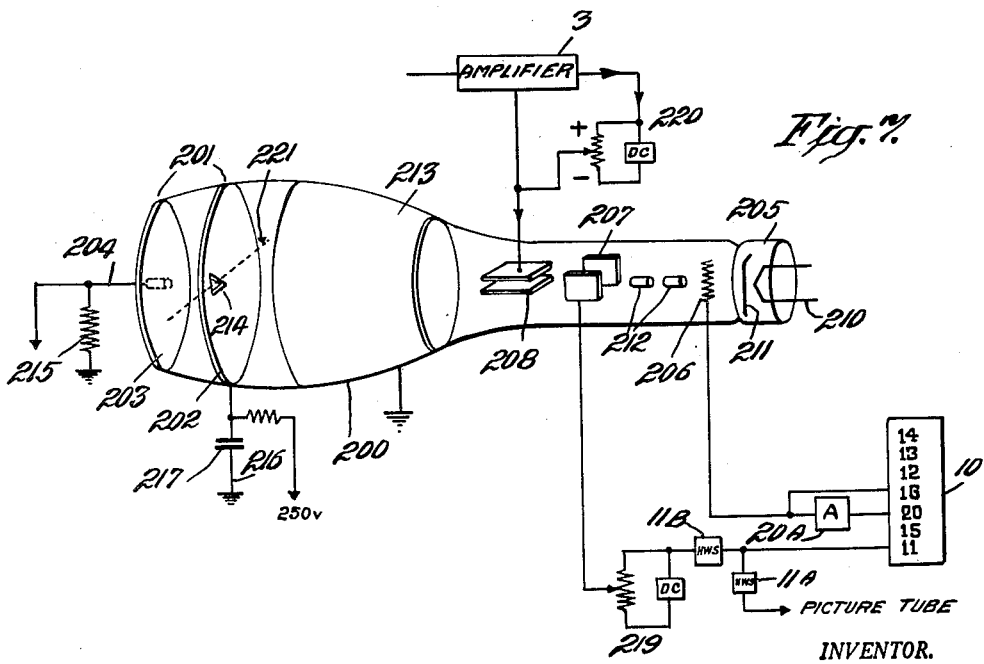
INVENTOR.
James E. Robinson
BY Darby & Darby
ATTORNEYS March 17, 1953     J. E. ROBINSON     2,632,148
SYSTEM FOR THE TRANSMISSION OF INTELLIGENCE BY RADIO
Original Filed Jan. 3, 1948     8 Sheets-Sheet 4
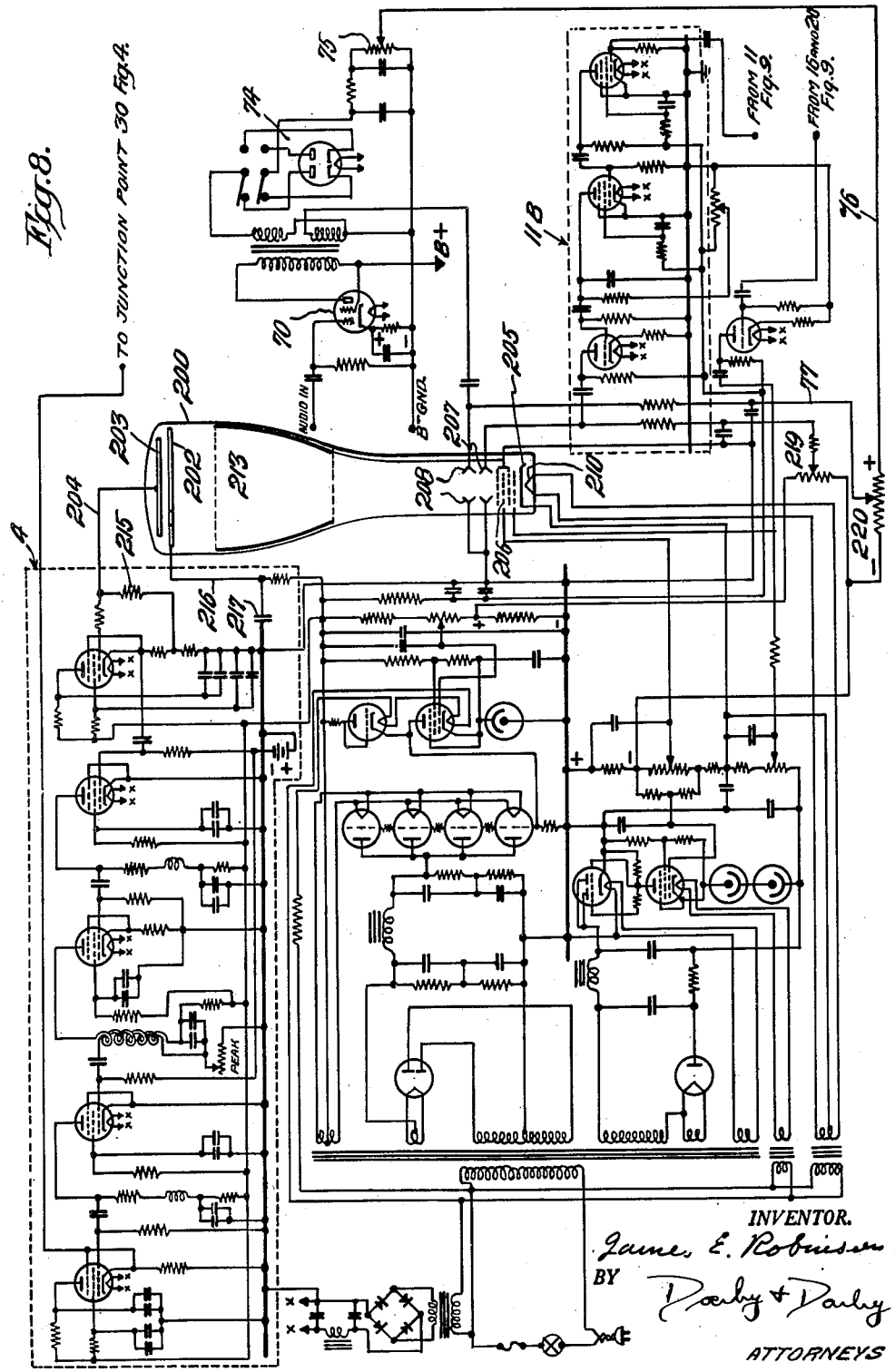

March 17, 1953 J. E. ROBINSON 2,632,148
SYSTEM FOR THE TRANSMISSION OF INTELLIGENCE BY RADIO
Original Filed Jan. 3, 1948 8 Sheets-Sheet 5
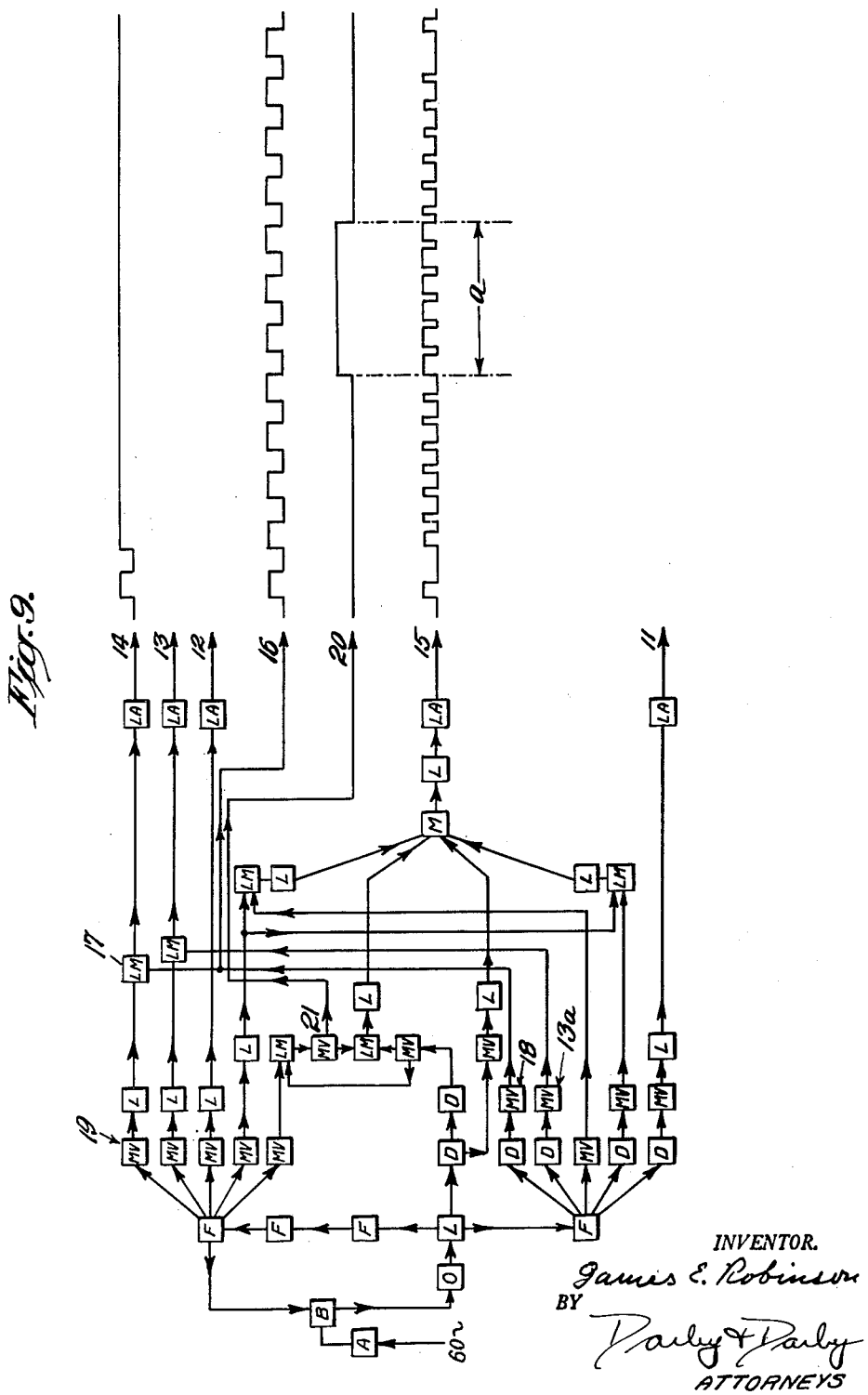
INVENTOR.
James E. Robinson
BY
Darby & Darby
ATTORNEYS March 17, 1953 J. E. ROBINSON 2,632,148
SYSTEM FOR THE TRANSMISSION OF INTELLIGENCE BY RADIO
Original Filed Jan. 3, 1948 8 Sheets-Sheet 6
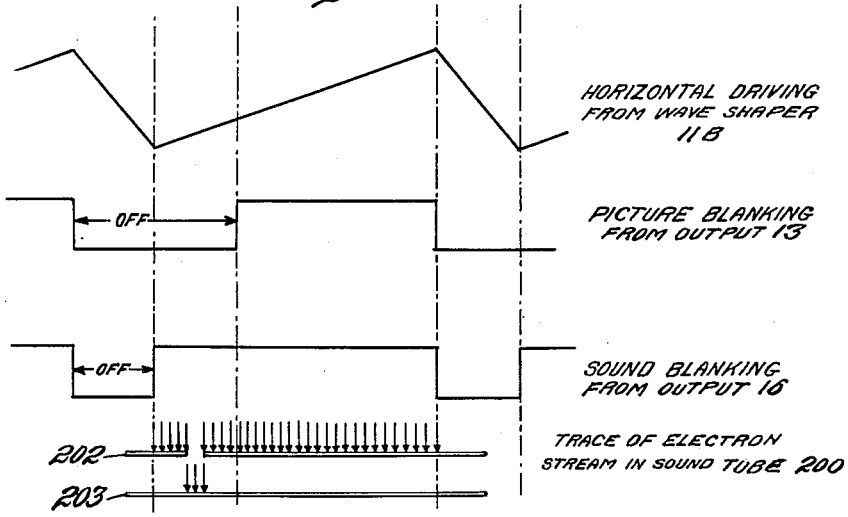
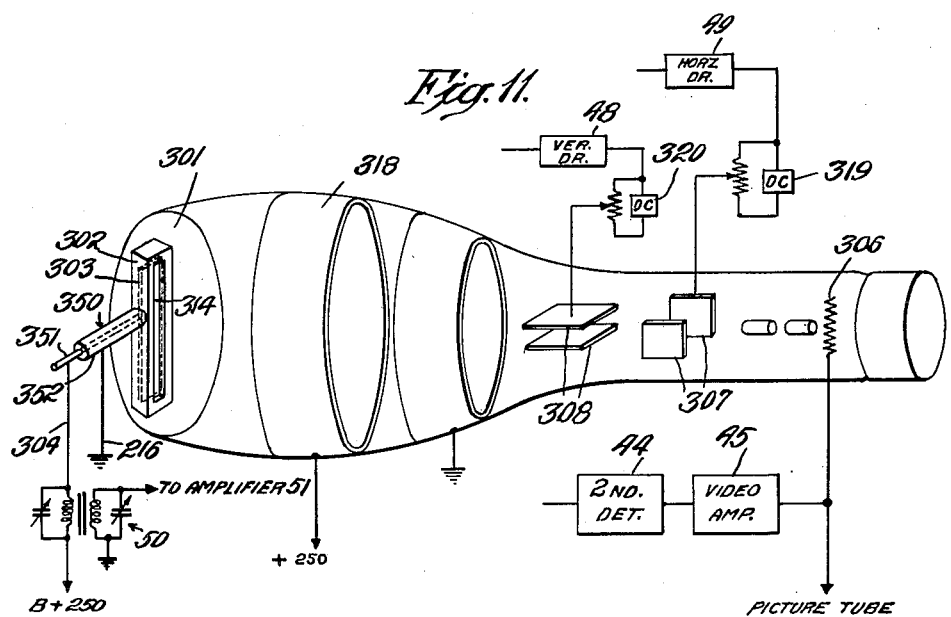
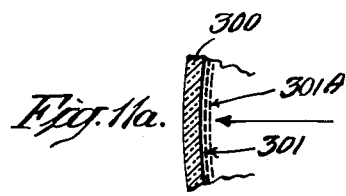
INVENTOR.
James E. Robinson
BY
Darby & Darby
ATTORNEYS March 17, 1953    J. E. ROBINSON    2,632,148
SYSTEM FOR THE TRANSMISSION OF INTELLIGENCE BY RADIO
Original Filed Jan. 3, 1948    8 Sheets-Sheet 7
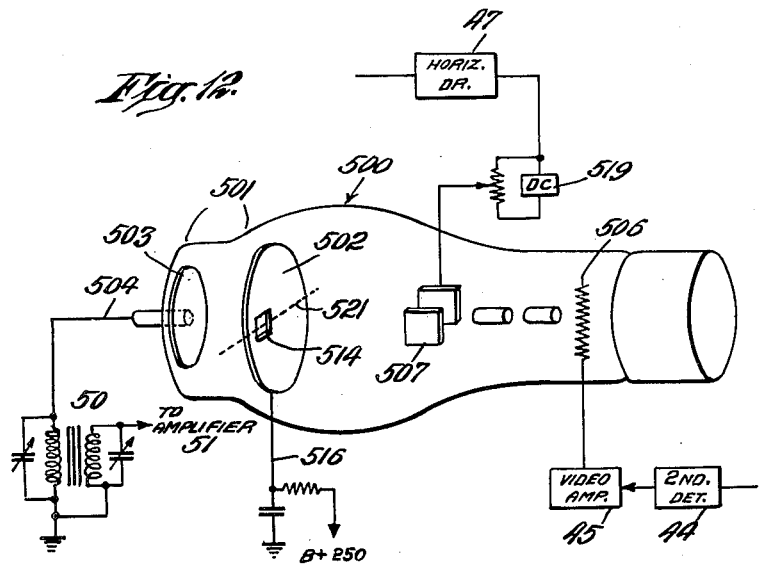
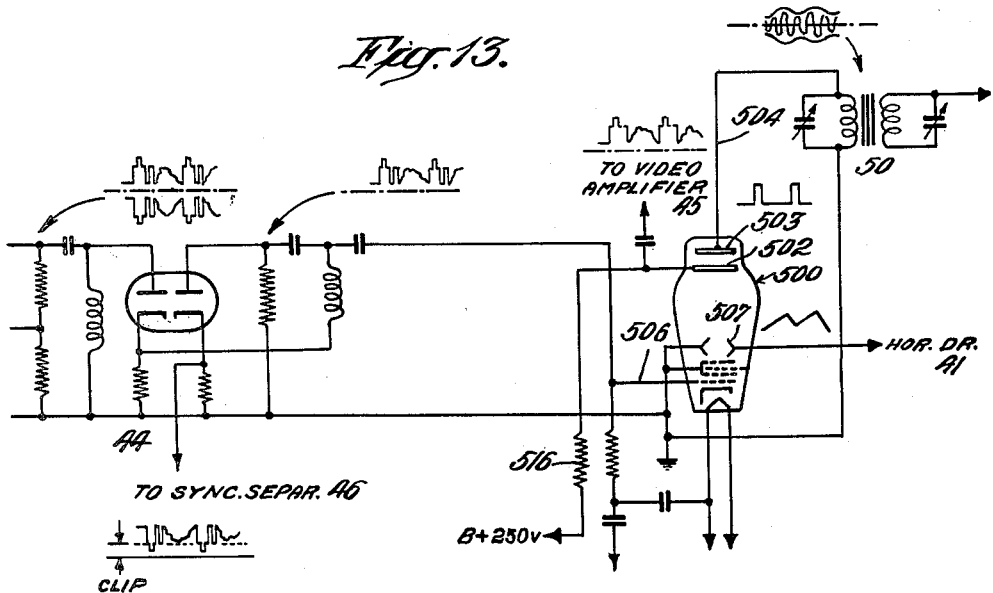
INVENTOR.
James E. Robinson
BY
Darby & Darby
ATTORNEYS March 17, 1953 J. E. ROBINSON 2,632,148
SYSTEM FOR THE TRANSMISSION OF INTELLIGENCE BY RADIO
Original Filed Jan. 3, 1948 8 Sheets-Sheet 8
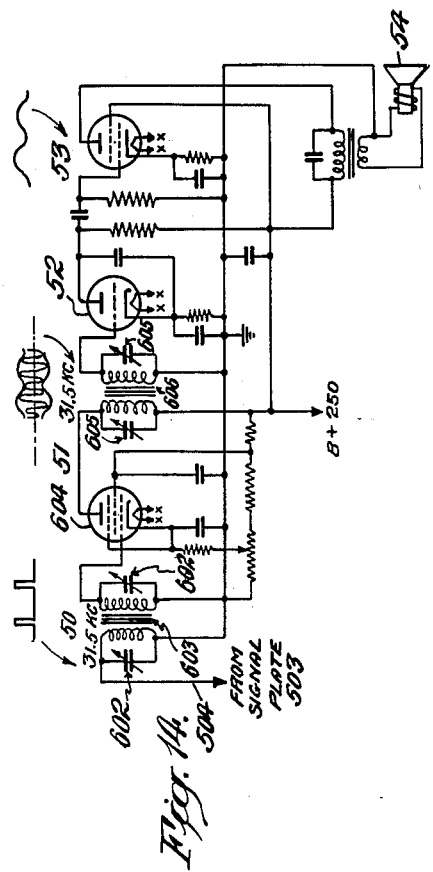
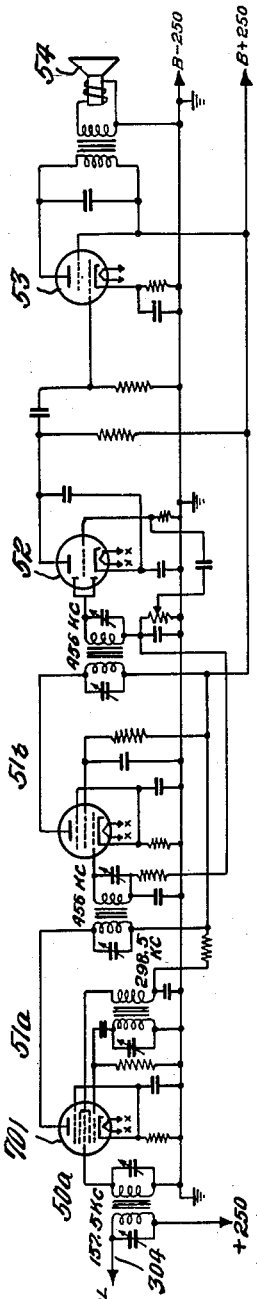
INVENTOR.
BY James E. Robinson
Darby & Darby
ATTORNEYS

UNITED STATES PATENT OFFICE 2,632,148

SYSTEM FOR THE TRANSMISSION OF INTELLIGENCE BY RADIO

James E. Robinson, Eggertsville, N. Y., assignor to American Optical Company, Southbridge, Mass., a voluntary association of Massachusetts Original application January 3, 1948, Serial No. 460. Divided and this application February 12, 1949, Serial No. 76,166

11 Claims. (Cl. 332—13)

This is a division of application Serial No. 460, filed January 3, 1948.

This invention relates to a system for the transmission of intelligence by radio. The primary object of the invention is to provide for the transmission of pictures and sound on the same carrier wave.

The signal transmitted in television is of a complicated nature owing to the fact that it is necessary to transmit not only the intelligence of each line of the picture but also synchronizing signals for controlling the scanning operation at the receiving end. Such synchronizing signals must control the trace and retrace movements for each line of the picture, and the vertical shift between lines and the vertical retrace at the end of the scanning of each frame and the blanking out during both retrace periods. Signals containing the intelligence of successive lines of the picture and the synchronizing signals are combined to produce a composite "video" signal having the wave form indicated in Fig. 1. In order to transmit sound signals on the same carrier as the picture signal, it is necessary to provide sound signals which can be introduced into this composite wave form without interfering with the picture signals or synchronizing signals.

In accordance with my invention, the sound signals take the form of time-width-modulated pulses whose wave form is shown in Fig. 2. It will be seen that these are pulses extending only in one direction (negative in Fig. 2) and that they are of uniform amplitude except for a periodic uniform increase in amplitude indicated at $a$ in Fig. 2.

In order to combine these sound signals with the composite video signal of Fig. 1, it is necessary merely to shorten slightly the length of the signal $c$ representing each line of the picture. This can easily be done by adjusting the one of the oscillators in a conventional synchronous generator which controls the horizontal blanking at the transmitting end of the system. With this slight change in the video signal, the video and sound signals are combined producing the wave form shown in Fig. 3. It will be seen that in this wave form the width-modulated sound pulses are of uniform effective amplitude, that is to say, the ends of the pulses are at the same negative voltage.

The creation and use of the combined signal shown in Fig. 3 involves a number of difficult problems:

(1) The sound pulses must be exactly synchronized with the video wave in order not to interfere either with the picture signals or the synchronizing signals. The accuracy of the synchronization required is apparent from the fact that the length of the time period $b$ from the start of scanning one line of the picture to the start of scanning the next line is less than $\frac{1}{15,000}$ of a second. An error amounting to a small fraction in this very short time period will create interference between the sound and picture signals.

(2) The sound pulses must be abrupt and the apparatus producing them must avoid any signal or variation in voltage between the pulses, for any change of voltage between the pulses will cause interference with the picture signals.

(3) The third difficulty arises from the wide variation of the sound frequencies which must be transmitted and the relation between these frequencies and the frequencies used in connection with scanning in television. The sound frequencies to be transmitted are from 20 to 9,000 cycles per second. The frequencies used in television scanning are 30 cycles per second and about 15,000 per second. The low frequency may cause objectionable audible interruptions in the sound. The high frequency, while greater than the sound frequency, is near enough this frequency to cause objectionable beating when the two frequencies are allowed to have an additive effect.

My invention solves these problems in a simple way by modifying the conventional television system by the introduction of additional cathode ray tubes controlled by the synchronous generator now forming a necessary part of the system.

At the transmission end of the system, I have combined two cathode ray tubes, both of which are connected to the same synchronous generator and each of which has an unmodulated electron stream, that is, one of uniform intensities. The electron streams of the two tubes are oscillated in synchronism; in one of them, which produces sound pulses, the stream is oscillated in a straight line, while in the other, which produces picture signals, the stream is moved at right angles to the direction in which it is oscillated in order that it may scan a mosaic screen target. The tube whose electron stream is oscillated in a straight line is caused to generate sound-modulated pulses by applying a sound-modulated deflecting force to the stream at a point separated from that at which the oscillating force is applied, so that no beating between the sound frequency and the oscillation frequency occurs. A further feature of my cathode ray tube pulse generator consists in eliminating all voltage signals or variations in voltage created by the oscillating electron stream during the time between successive sound pulses.

At the receiving end of the system, the position of an oscillated electron stream which is modulated by a composite sound-and-picture signal is utilized to separate out the sound signals from the composite signal. The electron stream may be that of the picture-reproducing tube, or may be that of a separate cathode ray tube which is synchronized with the picture-reproducing tube. My invention includes also an inertia means for generating an audio wave from the separated sound pulses.

In order that the nature of my invention may clearly be understood, I will describe in detail the specific embodiments of my invention which are illustrated in the accompanying drawings in which:

Figs. 1, 2 and 3 are wave diagrams, Fig. 1 showing the standard video wave form, Fig. 2 the wave form of a sound pulse generated in accordance with my invention, and Fig. 3 the wave form of a combined picture-and-sound signal in accordance with my invention;

Fig. 4 is a block diagram of a picture-and-sound transmitter;

Fig. 5 is a block diagram of a picture-and-sound receiver in which a single cathode ray tube is used to reproduce the picture and to separate out the sound signals;

Fig. 5A is a partial diagram of a modified receiver in which the sound signals are separated by a cathode ray tube separate from the cathode ray tube which reproduces the picture but connected in parallel therewith;

Fig. 6 is a diagram of a further modified receiver in which the cathode ray tube for separating out the sound signal is connected in series with the cathode ray tube which reproduces the picture;

Fig. 7 is a diagrammatic perspective of the cathode ray tube for generating sound pulses, showing diagrammatically the electrical connections of each part of the tube;

Fig. 8 is a circuit diagram of the connections of the pulse-generating tube;

Fig. 9 is a block diagram of a standard synchronous generator showing additional connections forming part of my invention and indicating the wave forms at some of the generator terminals;

Fig. 10 is a diagram indicating the synchronization of the picture and sound tubes at the transmission end of the system;

Fig. 11 is a diagrammatic perspective of a cathode ray tube for reproducing a picture and separating out the sound signals, showing diagrammatically the electrical connections of each part of the tube, and Fig. 11A is a fragmentary transverse section of the end of the tube showing a modification;

Fig. 12 is a diagrammatic perspective of a cathode ray tube for separating out sound signals, showing diagrammatically the electrical connections to each part of the tube when the tube is used in parallel with the picture-reproducing tube as in Fig. 5A;

Fig. 13 is a circuit diagram showing the separating tube connected in series with the picture-reproducing tube as in Fig. 6;

Fig. 14 shows a circuit for recreating a sound wave from sound-modulated pulses; and Fig. 15 shows a heterodyne circuit which may be substituted for the circuit of Fig. 14.

*General layout of system*

Before describing in detail the specific apparatus contained in the system of communication which I have invented, I will describe the general layout or arrangement of the system.

The transmitter of the system contains two cathode ray tubes 100, 200 controlled by a single synchronous generator 10, as shown in Fig. 4. The picture tube 100 may be of conventional construction. It is illustrated as a tube of the type called an iconoscope in which the light of the picture to be transmitted is focused on a mosaic screen 101 forming the target of the tube upon which a stream of electrons is projected by the usual "electron gun" 105. The sound tube 200 is provided with a target 201 consisting of an aperture plate 202 and a signal plate 203. A stream of electrons is projected on the target by the usual electron gun 205. The tubes are provided with control grids 106, 206 which are used, not to modulate the electron streams, but merely to cut them off, and also, in the case of the tube 200, to cause periodic changes in the intensity of the stream. The tubes are provided with "horizontal" and "vertical" deflecting means 107, 108, 207, 208.

The tubes are controlled and synchronized by connections to the synchronous generator 10. The horizontal deflecting plates 107 and 207 are connected in parallel to a terminal 11 of the generator through wave-shapers 11a, 11b, which produce saw-tooth waves. The vertical deflecting plates 108 are connected to a terminal 12 through a waveshaper 12a which produces a saw-tooth wave of less frequency to produce the required vertical scanning. The vertical deflecting means 208 has no connection with the terminal 12, but receives an audio wave from a microphone 1 through amplifiers 2 and 3. The grids 106 and 206 are connected to terminals 13, 16 of the generator 10 which provide cut-off or blanking impulses of slightly different lengths. The grid 206 also receives the key impulse from the terminal 20 of the generator for a purpose hereinafter explained.

The outputs of the two tubes, after amplification in high-frequency amplifiers 4, 5, are combined at the point 30 after the picture signal from the mosaic screen 101 has been combined with synchronizing and blanking signals from the generator 10 in a mixing amplifier 31. The output from the signal plate 203 of the tube 200 is a series of sound-modulated pulses of the form shown in Fig. 2. At the point 30, the combined sound-and-picture wave form shown in Fig. 3 is produced. It is used to modulate a carrier produced in the oscillator 32, and the modulated carrier is radiated from an antenna 33.

The receiver of the system contains either a combination picture-reproducing and sound-separating tube 300 (Fig. 5) or a conventional picture-reproducing tube 400 and a separate separating tube 500 (Figs. 5A and 6). The receiver contains the usual antenna 40, radio frequency and intermediate frequency amplifiers 41—43 and a detector 44. From the detector 44 or an amplifier 45 beyond it, the combined signal is sent to a separator or clipper 46 which is actuated by the synchronizing signal contained in the combination signal to operate a horizontal drive generator 47 and a vertical drive generator 48 which produce saw-tooth waves like those from the wave-shapers 11a, 11b, 12a. The combined sound-and-picture signal is also led from the detector 44 through the amplifier 45 to the grid 306 of the tube 300 to modulate its electron stream in accordance with the combined signal. The stream is given a scanning movement by connections from the generators 47 and 48 to its horizontal and vertical deflecting means 307, 308. At the end of the tube 300 is a fluorescent screen positioned to intercept the electron stream during the part of its movement in which it is modulated by a picture signal and a signal plate 303 which intercepts the stream when it is being modulated by the sound signal. The signal plate 303 is connected to a circuit for reconstituting the sound from sound-modulated pulses, which includes a resonant circuit 45, a tuned amplifier 51 and a detector 52, and is hereinafter described in detail.

In the modified receiver shown in Fig. 5A, the grids 406, 506 of an ordinary picture-reproducing tube 400 and a special separating tube 500 are connected in parallel to the amplifier 45 so that each receives the combined sound-and-picture signal. The tube 500 has only one deflecting means 507. This is connected through a voltage reducer 47a in parallel with the horizontal deflecting means 407 of the tube 400 to the horizontal drive generator 47, so that the modulated electron stream of the tube 500 is oscillated in synchronism with the horizontal oscillation of the stream of the picture tube 400. The tube 500 has a target consisting of an aperture plate 502 and a signal plate 503 so positioned that the modulated electron stream strikes the signal plate 503 only when the stream is modulated by a sound pulse. The signal plate 503 is connected to the sound-reproducing circuit 50—52.

In the receiver shown in Fig. 6, the separating tube 500 and the picture tube 400 are connected in series. In this case, the combined sound-and-picture signal is directed from the detector 44 to the grid of the separating tube 500. The signal plate 503 of this tube separates out the sound pulses as before and is connected to the sound-reproducing system 50—52. The aperture plate 502 of the tube 500, which is positioned to intercept the electron stream except while it is being modulated by the sound signal, is connected through the amplifier 45 to the grid 406 of the picture-reproducing tube 400, which, therefore, receives only the picture signal. In this case, the tube 400 cannot show a picture of the sound pulses, as is possible in the tube 400 connected as shown in Fig. 5A.

It will be seen from the above description that the construction and connections of the pulse-generating tube 200 and the pulse-separating tubes 300 and 500 form vital parts of my system.

*Pulse-generator tube*

The construction of the pulse-generating tube 200 is shown in Fig. 7. It contains a conventional electron gun 205 consisting of a filament 210, a cathode 211, and focusing electrodes 212 connected to an anode band 213. The horizontal deflecting plates 207 and vertical deflecting plates 208 of the tube are separated from each other longitudinally of the tube so that they act upon separate parts of the electron stream. This, coupled with the fact that they deflect the stream in mutually perpendicular directions, prevents them from having any additive effect.

The target 201 at the end of the tube includes an aperture plate 202 containing a triangular opening 214 and a signal plate 203 positioned behind the aperture plate so that the electron stream may strike it only when it passes through the opening 214. The aperture plate and the signal plate are insulated from one another and separated by a distance which makes the capacitance between them very small. A separation of about 3/4 inch has been found satisfactory where the plates are 5 inches in diameter. Capacitance can be further reduced by making the signal plate smaller. The signal plate 203 is made of aluminum or silver or other high-emission material, while the aperture plate or at least the back face of it is made of low-emission material. Most desirably, the aperture plate consists of metal covered with a layer of graphite. The low-emission rear surface of the aperture plate prevents the rear surface of this plate from emitting any electrons which would strike the signal plate, or, in other words, it prevents multiplier action between the plates.

The output circuit 204 of the tube is connected to the signal plate 203 and may contain a load resistor 215 as shown in Fig. 7. Voltage pulses produced when the electron beam of the tube passes through the aperture 214 and strikes the signal plate 203 are developed on the signal plate and in the load resistor and transmitted through the output circuit.

To prevent any changes in voltage caused by impingement of the electron stream on the aperture plate 202 from affecting the signal plate or the output circuit 204, such changes in voltage are drawn off by a circuit entirely independent of the output circuit 204. In the form shown in Fig. 7, this circuit forms an A. C. path 216 connecting the aperture plate 202 to ground. This path contains a condenser 217 (having a capacitance much greater than the capacitance between the plates 202 and 203) in order that a positive D. C. voltage, such as 250 volts, may be applied to the aperture plate to accelerate the electron stream in its passage through the aperture 214 and increase the response of the signal plate 203.

The electron beam is focused on the aperture plate 202 and is oscillated by a saw-tooth voltage applied to the horizontal deflecting plates 207 by a connection through a wave-shaper 11b to the terminal 11 of the synchronous generator 10. The plates 207 are also connected with a centering device 219 by which a D. C. voltage may be applied to them. A similar centering device 220 is connected to the vertical deflecting plates 208. As no saw-tooth voltage is applied to the vertical deflecting plates, the electron beam oscillates back and forth across the target 201 in a straight line 221. By adjustment of the centering device 220, the vertical position of this line is adjusted so that it crosses the wedge-shaped opening 214. By adjusting the centering device 219, the stream is made to cross the opening at the desired point of its sweep so that the time of occurrence of the pulses may be predetermined with great exactness.

The time length of the periods during which the electron stream passes through the opening 214 which depends upon the width of the opening at the point at which the line 221 crosses the opening, is modulated by an audio wave applied to the vertical deflecting plates 208. This audio wave is obtained by a connection from the amplifier 3 shown in Fig. 4. In addition, a rectified voltage obtained from the amplifier 3 and proportional to the general volume of the sound is applied to the vertical deflecting plates 208. The purpose of this is to make the width of the pulses generally proportional to the volume of sound, so that the modulation applied to the width of the pulses when the sound volume is low will be a substantial proportion of their width. In this way, the ratio of a degree of modulation to the time widths of the pulses is maintained substantially uniform.

When the wedge-shaped aperture 214 has straight sides as shown in the drawings, the relation between the time-widths of the pulses and the amplitude of the modulating current is linear. By changing the shape of the wedge-shaped area and giving it appropriately curved sides, the time-widths of the pulses may be made to vary in accordance with any desired function of the modulating voltage.

The tube 200 is controlled by the synchronous generator 10 in such a manner as to produce pulses of the form shown in Fig. 2 which may be combined with the composite video signal of Fig. 1 without interference.

The synchronous generator 10 shown in Figs. 4 and 9 differs in only minor respects from a standard synchronous generator for television. It is provided with the usual 60-cycle phase-shift circuit A, 60-cycle lock-in circuit B, oscillator O and with the frequency-dividing circuits F, delay circuits D, multi-vibrators MV, limiters L and mixers M required to produce at its outputs 11—15 the different wave forms used in a television system. The generator illustrated in Fig. 9 contains two additional outputs 16 and 20.

The kinescope blanking impulse at the output 14 which is connected to the mixer 17 is a combination of a horizontal blanking impulse derived from the multi-vibrator 18 and a vertical blanking impulse derived from the multi-vibrator 19. A new output 16 is connected to the multivibrator 18 in advance of the mixer 17 so that only a horizontal blanking impulse is felt at the output 16. The wave form received at this outlet is indicated in Fig. 9.

The synchronizing signal at the output 15 has a wave form indicated in Fig. 9, in which narrow waves are replaced by wide waves during intervals $a$ which occur during the vertical retrace period. The parts of the synchronous generator which build up this wave form include a multivibrator 21 which puts out a so-called keying signal which is a square wave occurring only in the period $a$. The new terminal 20 is connected directly to the multi-vibrator 21.

As shown in Fig. 4, the outputs 13, 14 of the synchronous generator 10 are connected respectively to the grid of the picture tube 100 and to the mixing amplifier 31. However, an adjustment is made in the synchronous generator 10 which changes the usual character of the iconoscope-blanking impulse of the output 13. The multi-vibrator 13$a$ (Fig. 9) which produces the horizontal blanking component of the iconoscope-blanking impulse is adjusted to increase the usual length of the horizontal blanking pulse so that it starts slightly after the end of the retrace period. This adjustment may easily be made by means of the horizontal iconoscope-blanking width control which is ordinarily provided in a synchronous generator to control the multi-vibrator 13$a$. This change slightly reduces the length of the picture signal $c$ for each line as is apparent by comparing Fig. 1 with Fig. 3.

The grid 206 of the sound tube 200 (Fig. 7) is connected to the new terminal 16 to receive the blanking impulse from the multi-vibrator 18 which is slightly shorter than the horizontal blanking impulse applied to the picture tube (see Fig. 10) and serves to cut off the electron stream in the tube 200 only during the retrace period. By adjustment of the centering device 219 the electron stream of the tube 200 is made to cross the opening 214 in the aperture plate 202 near the beginning of the trace movement, before the end of the picture blanking impulse and after the end of the blanking impulse applied to the tube 200 (see Fig. 10). Consequently, the pulses received on the signal plate 203 when the electron stream strikes this plate occur just before the beginning of each signal representing a line of picture (see Figs. 10 and 3). No signal is received at the plate 203 during the retrace period as the electron stream is cut off by the blanking impulse from the terminal 16 during this period.

Although the electron stream of the picture tube 100 is cut off during the vertical retrace period $a$ (Fig. 1), it is important that the sound pulses continue during this period in order to avoid audible interruptions in sound transmission. It is for this reason that no vertical blanking impulse is applied to the grid of the tube 200. Furthermore, uniform effective amplitude of the sound pulses is maintained during the vertical retrace period $a$. Fig. 1 shows that in the standard video signal a more positive voltage occurs during the retrace period $a$ at the time of the sound pulses than occurs during the rest of the signal during the time of sound pulses. To provide a uniform effective amplitude of the sound pulses in the combination signal shown in Fig. 3, the actual amplitude of the sound pulses is increased during the vertical retrace period $a$ as shown in Fig 2.

This is accomplished according to my invention by applying the keying signal from the new terminal 20 of the synchronous generator to the grid of the sound tube 200. It is applied as a positive voltage impulse which periodically increases the intensity of the electron stream in this tube. The pulse is applied through an amplifier 20$a$ (Fig. 7) and the gain of this amplifier is regulated so that the increased amplitude of the pulses produced during the period $a$ is equal to the increased positive voltage of the standard video signal during this period. This regulation may be made by merely listening to the sound at the receiving end of the system and adjusting gain of the amplifier 20$a$ so that no periodic decrease or increase in the sound is heard.

When the electron stream is cut on and off by the blanking impulse on the grid 206 and when it changes its direction of movement, it creates a signal or change in voltage on the target. It is, therefore, important that at these times the electron stream strikes the aperture plate 202 so that these signals may be led off to ground through the connection 216 and thus not affect the signal plate 203. It is apparent from the diagram Fig. 10 that the electron stream strikes the aperture plate 202 at the times when it is cut on and off by the blanking impulse. It also strikes this plate at the times when its intensity is changed by the keying impulse from the terminal 20 of the synchronous generator. It follows that the changes of voltage caused by the electron stream between successive sound impulses have no effect on the signal plate 203 and therefore cause no interference with the picture signals when the sound signals are combined with the video signal.

An illustrative wiring diagram of the connections of the pulse-generating tube 200 is shown in Fig. 8.

In connection with the modulating input to the tube 200, Fig. 8 shows a tube 70 which is the last stage of the amplifier 3 shown in Fig. 4. The plate circuit of this tube is connected to the vertical deflecting plates 208 of the tube 200 and also to a rectifier 74 which produces in a resistance 75 a voltage drop proportional to the general volume of the sound. This voltage is applied to the deflecting plates 208 through leads 76, 77. In the lead 77 is introduced the centering device 220.

In connection with the output from the tube 200, Fig. 8 shows the output circuit 204 connected to a multistage high-frequency amplifier 4 which is like the amplifier 5 (Fig. 4) customarily used on the output of a picture tube or iconoscope. The amplifier 4 is connected to an output terminal from which connection is made to the junction point 30 (Fig. 4). The amplifiers 4 and 5 introduced between the outputs of the tubes 200 and 100 and the junction point 30 serve to isolate the targets of the two tubes from each other to prevent signals on one target from affecting those on the other. The amplifier 4 also provides an easy means for controlling (by the number of stages of amplification used) the polarity of the sound pulses when they reach the junction point 30, so that at this point the pulses may have a polarity opposite to that of the blanking signal which is contained in the composite video signal as shown in Figs. 1 and 2.

*Pulse-separator tube*

The pulse-separator tube 500 is shown in Fig. 12. It is in general similar to the pulse-generator tube but differs from it in having only one set of deflecting plates 507 which correspond to the horizontal deflecting plates 207 of the generator tube and in having a rectangular opening 514 instead of a wedge-shaped opening in its aperture plate 502. As in the generator tube, the aperture plate 502 and the signal plate 503 are insulated from one another and at least the rear surface of the aperture plate 502 is coated with graphite or other low-emission material, while the signal plate 503 is of aluminum, silver or other high-emission material. The electron stream of the tube is modulated by the combined sound-and-picture signal by connecting its grid 506 to the detector 44 through the amplifier 45 (Fig. 5). A saw-tooth voltage from the horizontal driving generator 47 (Fig. 5) is connected to the deflecting plates 507 to cause the electron stream of the tube to oscillate in a line 521 across the aperture plate 502. This line extends across the rectangular aperture 514. A centering device 519 connected to the plates 507 is regulated so that, during the part of the sweep of the electron beam in which the sound pulse occurs, the beam is crossing the aperture 514 so that the voltage produced by the sound pulses is received by the signal plate 503, while the voltage produced by the rest of the combined signal is received on the aperture plate 502. An output circuit 504 connects the signal plate 503 to the reproducing mechanism hereinafter described.

When the separating tube is connected in parallel with a picture-reproduction tube as shown in Fig. 5A, the aperture plate 502 is connected to ground by a path 516 so as to draw off the signal so that it cannot affect the signal plate 503. When the two tubes are connected in series as shown in Fig. 6, the aperture plate 502 is connected to the grid of the picture-reproducing tube 400. The connection is made through an amplifier 45 which serves to isolate the two tubes and to prevent the signal on the aperture plate 502 from affecting the signal plate 503. An illustrative circuit diagram of the series connection is shown in Fig. 13.

The tube 300 which both reproduces the picture and separates out the sound pulses is shown in Fig. 11. It has all the parts of an ordinary picture-reproduction tube such as the type called a kinescope except that its fluorescent screen 301 does not extend all the way across its outer end. At one side of the fluorescent screen is a long narrow aperture box 302 containing a long slit 314 in its inner face. The box is made of low-emission material such as metal coated with graphite. Within the box and insulated therefrom is a signal strip 303 of silver, aluminum or other high-emission material. A co-axial cable 350 extends out through the envelope of the tube having its inner conductor 351 connected to the signal strip 303 and its outer conductor 352 connected to the aperture box 302 and grounded by a connection 216. The tube is provided with a band 318 between the ordinary anode band 313 and the aperture box, and this band is maintained at a positive potential such as 250 volts.

When the tube is connected as shown in Fig. 5 so that its electron stream is modulated by the combined sound-and-picture signal, and scans the fluorescent screen 301, a centering device 319 connected to the horizontal deflecting plates 307 is adjusted so that the electron stream enters the slit 314 in the box 302 and strikes the signal plate 303 during the brief portion of each sweep in which it is modulated by a sound pulse and strikes the fluorescent screen 301 during the remainder of its travel.

The separated sound pulses received on the signal plate 303 are carried to the sound-reproducing circuit 50—52 by an output circuit 304 which includes the inner conductor 351 of the co-axial cable 350. A positive voltage of about 250 volts is applied to the signal plate 303 by connecting the resonant circuit 50 to a source of potential.

In a picture-reproducing tube, the electron stream creates irregular static charges on the fluorescent screen and the glass and there is considerable electron splatter from the screen. It is extremely difficult to prevent these effects of the stream from causing irregular voltage variation on the signal strip 303. Such voltage variation would, of course, prevent reception of the sound in pure form. By the arrangement illustrated, I have succeeded in protecting the signal strip 303 from such interference. Several features contribute to this important result. The acceleration of the stream by the voltage applied to the band 318 assists in causing rapid passage of the electrons through the slit 314 in the box 302 when the stream is directed towards this slit. The box prevents electron splatter from striking the signal strip 303. Charges produced on the box by such splatter are immediately drawn off to ground through the connection 216. This ground connection serves also to draw off some of the static charges on the glass, since the outer conductor 352 of the co-axial cable is in direct contact with the glass. Furthermore, in the case of a picture tube in which the fluorescent screen 301 is covered by a so-called metallic mirror layer 301a (Fig. 11a) the electrostatic charges on this layer are also drawn off through the outer conductor 352 and the ground connection 216. When such a mirror layer 301a is grounded by this means, it has the advantage of largely reducing the irregular electrostatic charges which would otherwise be built up on the fluorescent screen, and thus aids in preventing any extraneous voltage effects on the signal plate 303.

Sound-reproducing circuit

The circuit for reproducing sound from the separated sound-modulated pulses provides means for causing the pulses to create a continuous sound-modulated sinusoidal carrier wave having a frequency higher than the frequency of recurrence of the pulses so that it may be demodulated without beating between the sound frequency and the pulse frequency.

The series of sound-modulated pulses are applied to a resonant circuit tuned to an integral multiple of the frequency of recurrence of the pulses. A tuned circuit is an inertia device in the sense that a pulse applied to it will create in it a sinusoidal current oscillation which decays, i. e., decreases in amplitude to zero, over a period of time dependent upon the Q of the circuit. The resonant circuit used in my method has a resistance low enough to cause the oscillation set up by a single pulse to persist much longer than the interval between successive pulses or, in other words, the decay period of the circuit is longer than the interval between successive pulses. Since the circuit is tuned to an integral multiple of the frequency of recurrence of the pulses, the trains of waves set up by successive pulses are in phase. The additive effect of the trains of waves set up by the successive uniformly spaced pulses produces a sinusoidal wave whose amplitude varies in accordance with the energy of successive pulses. Thus, by applying the pulses to the tuned circuit without the application of any other energy thereto, there is set up a sound-modulated sinusoidal carrier from which the sound may easily be recovered by an ordinary detector de-modulator.

If the frequency of the modulated carrier produced in this way is no greater than the frequency of recurrence of the pulses, the de-modulation will produce audible beats. This is because the frequency of recurrence of the pulses is the frequency used for horizontal scanning in television, which under present standards is about 15,000 cycles per second (specifically, 15.75 k. c.), while the frequency of the highest sound to be transmitted is likely to run to 9,000 cycles per second.

An important feature of my invention is to avoid such beating by making the frequency of the sound-modulated carrier materially greater than the frequency of repetition of the pulses.

The pulses are applied to a resonant circuit tuned to an harmonic of the frequency of repetition of the pulses. The pulses will then set up in the circuit sinusoidal waves of the fundamental frequency of repetition and of the harmonic to which the circuit is tuned. The fundamental frequency is then eliminated. Thus, the resonant circuit may be connected to an amplifier tuned to the harmonic frequency so that the wave of harmonic frequency is amplified while the wave of the fundamental frequency is lost. In this way, a modulated carrier wave having a frequency of at least 30,000 cycles per second is produced. Such a wave may be demodulated to recover the sound without producing any audible beats. The tuned amplifier may be either of the ordinary type or of the heterodyne type.

Fig. 14 shows a sound-reproducing circuit including an ordinary amplifier. The circuit includes a resonant circuit 50 which is tuned, by condensers 602 and inductances 603, to the first harmonic (31.5 k. c.) of the frequency of recurrence of the sound pulses (15.75 k. c.). The separated sound pulses are introduced into the resonant circuit 50 from the output 504 of the separating tube 500. When the connection is made from the output 304 of the tube 300, the arrangement is the same except that the resonant circuit is connected to a source of potential as indicated in Fig. 11. Sinusoidal waves of the fundamental frequency (15.75 k. c.) and the harmonic frequency (31.5 k c.) are developed in the resonant circuit 50 and are fed to the tuned amplifier 51. The amplifier 51 has a three-element tube 604 to the grid of which the resonant circuit 50 is connected, so that the grid circuit of the amplifier is tuned to the harmonic frequency (31.5 k. c.). By means of condensers 605 and inductances 606, the plate circuit of the tube 604 is also tuned to the harmonic frequency (31.5 k. c.), so that only this frequency is amplified. The result is to produce in the plate circuit a sound-modulated wave of this frequency which is de-modulated in a detector 52 and passed through an audio amplifier 53 to a speaker 54.

Fig. 15 shows a sound-reproducing circuit including a heterodyne amplifier. This circuit includes a resonant circuit 50a similar to the resonant circuit 50 except that it is tuned to the tenth harmonic (157.5 k. c.) of the frequency of repetition of the pulses. The separated sound pulses are introduced into the resonant circuit 50a from the output 304 of the separating tube 300. When the connection is made from the output 504 of the tube 500, the arrangement is the same except that the resonant circuit is connected to ground as indicated in Fig. 12. The resonant circuit 50a is connected to a tuned heterodyne amplifier 51a. This amplifier contains a tube 701 in which the frequency of the tenth harmonic (157.5 k. c.) is heterodyned with a frequency of 298.5 k. c. to produce a frequency of 456 k. c. to which the plate circuit of the tube is tuned. The heterodyne amplifier thus amplifies only the tenth harmonic frequency from the resonant circuit 50a. The result is to produce in the plate circuit of the tube 701 a sound-modulated wave of a frequency of 456 k. c., which is further amplified in an amplifier 51b and de-modulated by a detector 52 connected through an audio amplifier 53 to the speaker 54.

The extraordinary fidelity of the reproduction of sound by the system which has been described is, in my opinion, at least partially the result of the following features which are combined in my system:

(1) The use of the position of synchronized oscillating cathode rays to introduce sound pulses into a video signal and to eliminate them therefrom, so that the time relation between the sound pulses and the parts of the video signal may be easily predetermined with great accuracy.

(2) The use of pulses having a frequency of recurrence materially above the frequency of the sound to be communicated.

(3) A generator of modulated pulses in which separate means having no additive effect are used to determine the frequency of recurrence of the pulses and the energy of the pulses, so that there is no beating between the frequency of the pulses and the modulation frequency.

(4) A cathode ray generator of modulated pulses in which all variations in voltage produced by the cathode ray between pulses are drawn off to ground so that they have no effect on the output of the tube.

(5) The use of the energy of the pulses to create a modulated sinusoidal carrier of a frequency higher than the frequency of recurrence of the pulses, from which the sound may readily be recovered by the use of an ordinary detector or demodulator.

It should be understood that in the claims which follow the terms "horizontal" and "vertical" are used in a relative sense only, as it would obviously not affect the operation of the apparatus to rotate any one of the tubes through an angle of 90°.

This application is a division of my application Serial No. 460, filed January 3, 1948, as a continuation-in-part of my application Serial No. 712,264, filed November 26, 1946.

What I claim is:

1. A pulse generator comprising a cathode ray tube, a target in said tube consisting of two conducting plates insulated from each other, the front one of which contains a wedge-shaped aperture, means for oscillating the cathode ray so that it periodically traces and retraces a substantially straight line on the front plate crossing the aperture, said line being substantially longer than the size of said aperture, sound-modulated means for shifting said line on the aperture so that the cathode ray produces a series of time-width-modulated pulses on the rear plate, and means for periodically increasing the intensity of the ray to increase the amplitude of said pulses during each trace without changing their time widths.

2. A cathode ray tube having a target comprising two conducting plates spaced and insulated from each other, the front plate containing an aperture, means for oscillating the cathode ray of the tube so that it traces a line on the front plate crossing the aperture, two electric circuits independent of the cathode ray tube circuits connected to the front plate and the back plate respectively and providing independent paths from said plates to ground so that any variations in voltage produced by the ray on the front plate do not affect the output circuit.

3. A cathode ray tube having a target comprising two conducting plates spaced and insulated from each other, the front plate containing an aperture, means for oscillating the cathode ray so that it traces a line on the front plate crossing the aperture, an output circuit connected to the back plate, means for applying a uniform positive voltage to the front plate to accelerate the passage of electrons through the aperture, and a circuit independent of the output circuit connecting the front plate to ground and containing a condenser having capacitance greater than the capacitance between the front and back plates.

4. A cathode ray tube having a target comprising two conducting plates spaced and insulated from each other, the front plate containing an aperture and one of the opposed surfaces of the plates consisting of low emission material to avoid multiplier action between the plates, means for oscillating the cathode ray of the tube so that it traces a line on the front plate crossing the aperture, an output circuit connected to the back plate, and an independent electric circuit connected to the front plate to draw off variations in voltage therefrom.

5. A cathode ray tube having a target comprising two conducting plates spaced and insulated from each other, the front plate containing an aperture and having a rear surface of low emission material and the back plate consisting of high emission material, means for oscillating the cathode ray of the tube so that it traces a line on the front plate crossing the aperture, an output circuit connected to the back plate, and an independent electric circuit connected to the front plate to draw off voltage variations therefrom.

6. A cathode ray tube having a target comprising two conducting plates spaced and insulated from each other, the front plate containing an aperture and having a rear surface of low emission material and the back plate consisting of high emission material, means for oscillating the cathode ray of the tube so that it traces a line on the front plate crossing the aperture, an output circuit connected to the back plate, and an independent electric circuit connected to the front plate and providing a path to ground so that any variations in voltage produced by the ray on the front plate do not affect the output circuit.

7. A pulse generator comprising a cathode ray tube, two deflecting means positioned to act upon longitudinally separated parts of the cathode ray and to deflect the ray in mutually perpendicular directions, a target in the tube consisting of two conducting plates spaced and insulated from each other, the front plate containing a wedge-shaped aperture, means for applying a saw-tooth wave to one deflecting means to oscillate the cathode ray so that it traces and retraces a line on the front plate crossing the aperture, means for applying a modulating voltage of a frequency approaching that of the saw-tooth wave to the other deflecting means to vary the position of the line on the aperture, two electric circuits independent of the cathode ray tube circuits connected to the front plate and the back plate respectively and providing independent paths from said plates to ground.

8. A pulse generator comprising a cathode ray tube, two deflecting means positioned to act upon longitudinally separated parts of the cathode ray and to deflect the ray in mutually perpendicular directions, a target in the tube consisting of two conducting plates spaced and insulated from each other, the front plate containing a wedge-shaped aperture, means for applying a saw-tooth wave to one deflecting means to oscillate the cathode ray so that it traces a line on the front plate crossing the aperture, means for applying a modulating voltage of a frequency approaching that of the saw-tooth wave to the other deflecting means to vary the position of the line on the aperture, means for applying a rectangular voltage wave of the same frequency as the saw-tooth wave to the grid of the tube to cut off and on the cathode ray while it is impinging on the front plate, two electric circuits independent of the cathode ray tube circuits connected to the front plate and the back plate respectively and providing independent paths from said plates to ground.

9. A pulse generator comprising a cathode ray tube, a set of deflecting plates in said tube, a target in said tube consisting of two conducting plates spaced and insulated from each other, the front plate containing an aperture, means for applying a saw-tooth wave to the deflecting plates to cause the cathode ray to trace a line on the front plate crossing the aperture, means connected to the grid of the tube for periodically causing abrupt variations in the intensity of the cathode ray, centering means connected to the deflecting plates for adjusting the swing of the cathode ray so that it impinges on the front plate at the moments of its variations in intensity, two electric circuits independent of the cathode ray tube circuits connected to the front plate and the back plate respectively and providing independent paths from said plates to ground.

10. A pulse generator comprising a cathode ray tube, two sets of deflecting plates in said tube positioned to act upon longitudinally separated parts of the cathode ray and to deflect the ray in mutually perpendicular directions, a target in the tube consisting of two conducting plates spaced and insulated from each other, the front plate containing a wedge-shaped aperture and having low emission material on its rear surface and a back plate consisting of high emission material, means for applying a saw-tooth wave to one set of deflecting plates to oscillate the cathode ray so that it traces a line on the front plate crossing the aperture, means for applying a modulating voltage of a frequency approaching that of the saw-tooth wave to the other set of plates to vary the position of the line on the aperture, an output circuit connected to the back plate, and an independent circuit connected to the front plate and providing a path to ground.

11. A pulse generator comprising a cathode ray tube, two sets of deflecting plates in said tube positioned to act upon longitudinally separated parts of the cathode ray and to deflect the ray in mutually perpendicular directions, a target in the tube consisting of two conducting plates spaced and insulated from each other, the front plate containing a wedge-shaped aperture and having low emission material on its rear surface and the back plate consisting of high emission material, means for applying a saw-tooth wave to one set of deflecting plates to oscillate the cathode ray so that it traces a line on the front plate, centering means connected to the other set of deflecting plates to position said line so that it crosses the aperture, means for applying a modulating voltage to said set of plates to vary the position of the line on the aperture, centering means connected to the first set of plates for adjusting the oscillation of the cathode ray so that it crosses the aperture in a predetermined part of each oscillation, an output circuit connected to the rear plate, and an independent circuit connected to the front plate and providing a path to ground.

JAMES E. ROBINSON.

REFERENCES CITED

The following references are of record in the file of this patent:

UNITED STATES PATENTS

| Number | Name | Date |
|---|---|---|
| 2,308,639 | Beatty et al. | Jan. 19, 1943 |
| 2,368,328 | Rosencraus | Jan. 30, 1945 |
| 2,418,133 | Miller et al. | Apr. 1, 1947 |
| 2,443,958 | Kimball | June 22, 1948 |
| 2,462,860 | Grieg | Mar. 1, 1949 |

FOREIGN PATENTS

| Number | Country | Date |
|---|---|---|
| 647,468 | Germany | July 5, 1937 |